Figure 1:
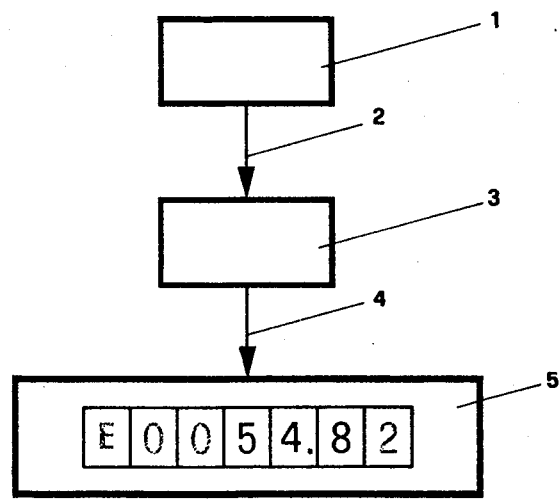

United States Patent [19]
Gallo et al.

[11] 4,171,026
[45] Oct. 16, 1979

[54] SCALE WITH A COMPUTING DEVICE AND A DIGITAL DISPLAY, IN PARTICULAR FOR COMMERCIAL APPLICATIONS

[75] Inventors: Mario Gallo; Johannes Wirth, both of Zurich, Switzerland

[73] Assignee: Wirth, Gallo & Co., Zurich, Switzerland

[21] Appl. No.: 871,475

[22] Filed: Jan. 23, 1978

[30] Foreign Application Priority Data

Jul. 28, 1977 [CH] Switzerland .................. 9330/77

[51] Int. Cl.² .................. G01G 19/04; G01G 7/00
[52] U.S. Cl. .................. 177/25; 177/DIG. 3; 364/567
[58] Field of Search .................. 177/1, 50, 199, 25, 177/165, 210 FP, DIG. 3

[56] References Cited

U.S. PATENT DOCUMENTS

| | | | |
|---|---|---|---|
| 3,788,410 | 1/1974 | Allenspach et al. | 364/567 X |
| 3,986,012 | 10/1976 | Loshbough et al. | 177/165 X |
| 4,063,604 | 12/1977 | Rock | 177/210 FP X |

FOREIGN PATENT DOCUMENTS 2325654  11/1973  Fed. Rep. of Germany .......... 177/164

*Primary Examiner*—George H. Miller, Jr.
*Attorney, Agent, or Firm*—Stevens, Davis, Miller & Mosher

[57] ABSTRACT

Scale with a computing device and a digital display, in particular for commercial applications, said scale having logical and computing means for selection of one measuring range out of at least two measuring ranges in function of the weight of the goods on its platform, the smallest display units of each range being at least in a ratio 1:2, and further logical and computing means for selection in function of the weight of the higest load that may be displayed.

4 Claims, 4 Drawing Figures

SCALE WITH A COMPUTING DEVICE AND A DIGITAL DISPLAY, IN PARTICULAR FOR COMMERCIAL APPLICATIONS

The invention relates to a scale with a computing device and a digital display, in particular for commercial applications.

Such scales are designed with a fixed number of computing units which must always be greater than the number of display units. The smallest possible ratio of these two numbers is set by legal prescriptions. These legal prescriptions also define a minimum load under which it is prohibited to weigh goods. As the absolute resolution of the scale in the whole weighing range is constant, the relative resolution at its beginning, i.e. below the minimum load is small and the possible relative error is large. For this reason it is not allowed in commercial applications to weight small quantities, e.g. 50 g and larger quantities, e.g. 30 kg on the same scale designed for the larger weights.

The weighing range below the minimum load is considerably smaller than the whole weighing range, therefore the absolute error in this range is smaller by several orders of magnitude than the total weighing error for the whole range, which in turn is the determining factor for the choice of the smallest display unit. The characteristic curve of the scale can be chosen so that this error remains small. For this reason as well as for reason of room saving, in particular in a retail shop, it would be desirable to be able to weigh also below the minimum load.

It is an object of the invention to provide a scale satisfying the legal prescriptions for both types of weighing. The scale according to the invention makes it possible in that it has logical and computing means for selection of one measuring range out of at least two measuring ranges in function of the weight of the goods on its platform, the smallest display units of each range being at least in a ratio 1:2 and in that it has further logical and computing means for selection in function of the weight of the highest load that may be displayed.

Such scales can also be used for difference weighing, for instance for dosing or for differencing the net weight from a tare. Also in this case the relevant weighing range is small compared with the total weighing range and the relative error is small compared with the total error. For such applications a tare circuit is preferably inserted between the computing device and the digital display, which tare circuit establishes the value of the tare with the same computing units as those used for the goods to be weighed.

Clearly the invention applies only to scales in which the systematic error is greater by at least one order of magnitude than the random error.

In the enclosed drawings embodiments of the object of the invention are shown schematically.

Figure 2:
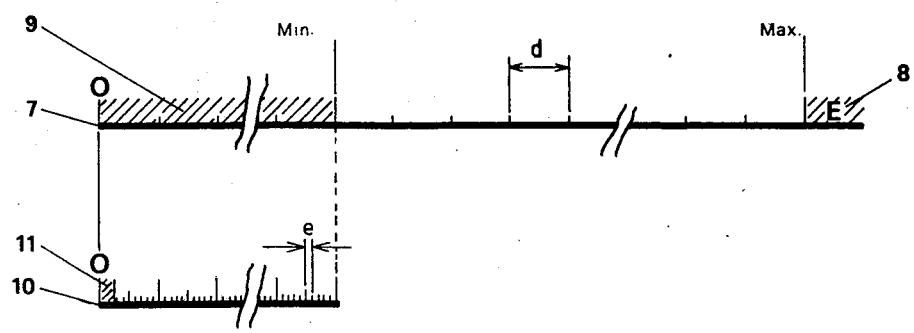
Figure 3:
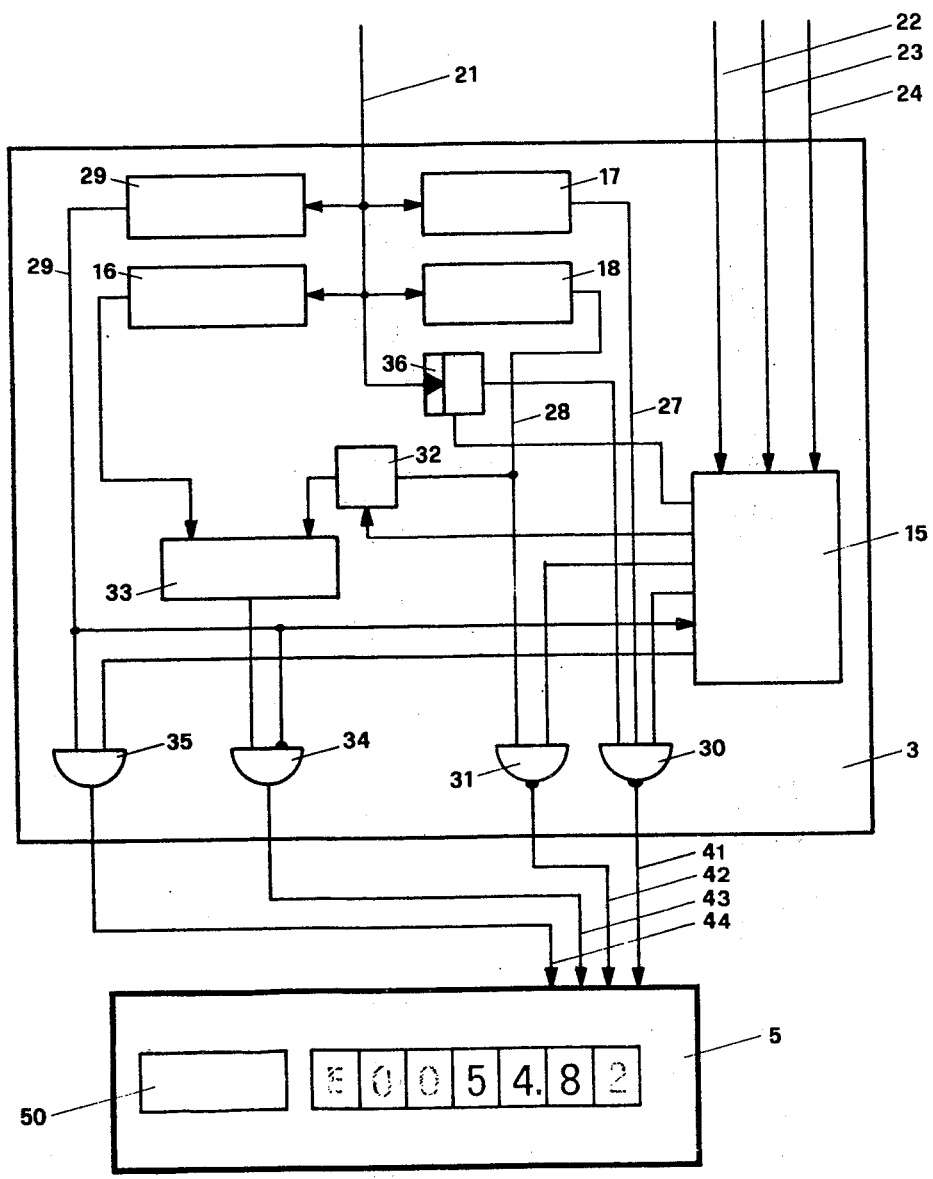
Figure 4:
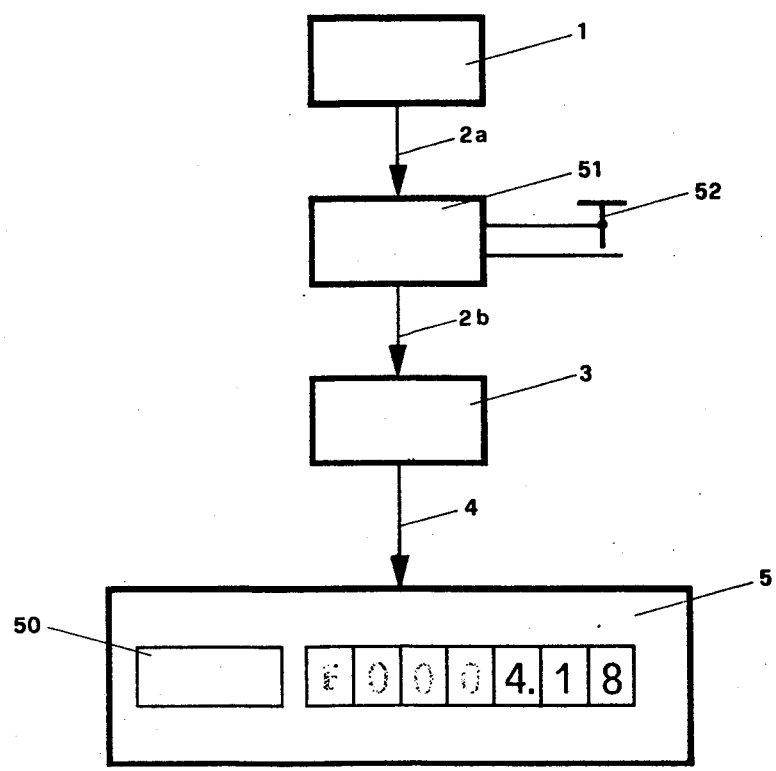

FIG. 1 shows a scheme of principle,
FIG. 2 shows the weighing ranges,
FIG. 3 shows the details of the logic,
FIG. 4 shows an alternate scheme of principle.

FIG. 1 shows a scheme of principle of a scale according to the invention. A measuring device 1 measures the weight of the goods to be weighed in computing units m. Device 1 can be a digital balance or an analogue balance with an analogue-digital-transducer, the computing device of the scale being in both cases part of the device 1. The result of the weighing is transmitted over a line 2 to a logic 3 represented in FIG. 3. This result after processing in logic 3 is transmitted over a line 4 to a digital display 5.

In FIG. 2 the whole weighing range 7 starts with the value zero and ends with the maximum load. After this point a range 8 follows in which the scale weighs but the display of the results is blocked because the systematic error becomes larger than allowed by legal prescriptions. In display 5 this situation is shown by a specific symbol, for instance capital letter E, the result not being displayed.

The state of the scale corresponding to range 7 is called "normal" and the smallest display unit is designated by d. At the lower end of range 7 there is a range 9 limited by the minimum load as defined by legal prescriptions. The magnitude of the minimum load is in a certain relationship with display unit d. In known digital scales for commercial applications the weight is either not displayed or specifically identified if it is smaller than the minimum load. The hatched range 9 can therefore not be used with known scales. In the scale according to the invention the weight is analyzed in logic 3 in order to establish whether it is greater or smaller than the minimal load. The weight is always computed in computing units m. If, for instance, $d = 10$ m and if the weight is smaller than the minimum load, the next smaller decade of display 5 is activated and the weight is displayed with display units equal to the computing units. Range 10 in FIG. 2 shows how the result, if smaller than the minimum load, is represented with display units e which are, for instance, 10 times smaller than the display units d. At the lower end of range 10 there is a range 11 which is limited by a new minimum load, that of range 10, which corresponds to another state of the scale called "fine".

Lines 2, 4 are not to be conceived electrotechnically as single wires, they represent signal flow channels which can comprise several wires. In a variant to FIGS. 1, 2 displaying of the result with display units e is not generated when the minimum load of the "normal" range 7 is not reached, but when the weight equals a pre-determined fraction, for instance 1/10 of the maximum load.

FIG. 3 shows logic 3 with its connections with display 5. A line 21 transmits the BCD coded representation of the weight from device 1 to logic 3. A line 22 transmits clock signals and a line 23 transmits clock signals indicating the beginning of each BCD decade. A gate signal is transmitted by a line 24. This gate signal corresponds to a logical ONE during the transmission of a weight result. Lines 21–24 comprise, besides the lines for tension setting and for current supply which are not shown, line 2 of FIG. 1. The signals from lines 22, 23 and 24 are fed to an overall control device 15, which generates the control and clock signals for all parts of logic 3 as described hereafter. The result of the weighing operation is transmitted to a buffer 16 and to three pre-set counters 17, 18, 19 working as discriminators and to a RS flip-flop 36 set to logical ZERO by device 15. Counter 17 assesses whether the minimum load of range 7 is reached or not (upper limit of range 9 in FIG. 2). Counter 18 with corresponding pre-setting assesses whether the minimum load of range 10 (upper limit of range 11 in FIG. 2) is reached. Counter 19, which is preset to the maximum load, assesses whether the weight is beyond this value or not. All three counters have on their output lines 27, 28, 29 a ZERO signal if the value to which they are set is not reached, else they have a ONE signal. The operation of logic 3 will be explained by means of four examples.

The weight of the goods is greater than the minimum load of range 7:

Counter 17 generates a ONE signal in line 27 so that the triple inverter AND-gate 30 is energized so as to generate a ZERO signal in line 41 if it receives also ONE signals from both device 15 and flip-flop 36. The latter generates ONE signals only if a signal is received from line 21 during a transmission period as defined by a gate signal in line 24. Then current supply for a field 50 with the indication "minimum load not reached" is inhibited. Counter 18 generates a ONE signal in line 28 so that a further inverter AND-gate 31 is energized, which generates a ZERO signal in line 42 if it receives a ONE signal from device 15. Then the display of the smallest display unit of display 5 is inhibited. Simultaneously line 28 energizes a read-only-memory 32 in which value 5 d is stored.

The weight is also stored in buffer 16. Device 15 transfers it from there into an adder 33. In this adder 33 the weight represented in computing unit m is added to the 5 d stored in read-only-memory 32. If the maximum load is not reached, line 29 remains with a ZERO signal transmitted to device 15 and to the inverter input of AND-gate 34. The latter is now open for transmission to display 5 of the weight augmented by 5 d. As display of the smallest display unit is inhibited, the result is displayed with a smallest unit d=10 m.

The weight of the goods is smaller than the minimum load of range 7:

Counter 17 sets line 27 to a ONE signal, line 28 remains with a ZERO signal as the pre-set value of counter 18 is not reached. Current supply to field 50 is inhibited, but the smallest decade of display 5 is now energized. Read-only-memory 32 is not energized, so that adder 33 transmits to display 5 the weight as it is stored in buffer 16, as the maximum load has not been reached so that AND-gate 34 is open. The weight—because it is smaller than the minimum load in this example—is now displayed with display units e which are equal to the computing units m. This state is called "fine".

The weight of the goods is smaller than the minimum load of range 10:

In this case line 27 bears a ZERO signal, the AND-gate 30 is not open, it generates a ONE signal which allows for current supply to field 50 and simultaneously inhibits all other display fields.

When no goods lie on the platform of the scale this minimum load is also not reached. The operator and the customer must be informed that the scale measures weight zero. This is realized by means of flip-flop 36. If during a transmission period no signal is generated in line 21, the output signal of flip-flop 36 remains a ZERO signal and AND-gate 30 remains closed. As a consequence no current is supplied to field 50 and no inhibition of the display fields occurs so that as many zeros are displayed as there are display fields in display 5.

The weight of the goods is greater than the maximum load of range 7:

Counter 19 generates a ONE signal in line 29 which energizes an AND-gate 35 which opens if it receives also a ONE signal from device 15.

Simultaneously the ONE signal of line 29 is transmitted to device 15 and to AND-gate 34 so that its output is now a ZERO signal. The output of AND-gate 35 is a ONE signal transmitted over line 44 to display 5 allowing for energization of field E indicating overload. As AND-gate 34 remains closed no weight result can be transmitted to display 5 and be displayed simultaneously.

Device 15 allows display of a new weight only if counter 19 is not reacting when the next result is read. Gates 30, 31, 35, read-only-memory 32 and reading of buffer 16 are activated by device 15 when the state of the scale is identified by logic 3 and before the next result is recorded in buffer 16 and transmitted to counters 17, 18, 19.

Lines 41, 42, 43, 44 comprise line 4 of FIG. 1.

According to a further variant not represented in the drawing the scale can operate in three states: "normal", "fine" and "very fine". The display units of the smallest decades of these states have a ratio 1:10:100. Logic 3 has in this case one additional counter similar to counters 17, 18, which checks whether the minimum load for state "very fine" is reached or not. Also logic 3 has a further AND-gate corresponding to AND-gate 30, 31. Rounding-off or adding 5 units of the highest not displayed decade is performed by the same read-only-memory 32 which is controlled and energized by device 15. Such a scale in which the display can work only for states "normal" and "fine" satisfies the legal prescriptions concerning the ratio of the computing and the display units.

In a further variant to FIG. 3 as well as to the variant with the three states "normal", "fine" and "very fine" the criteria for the change of state is no more that the respective minimum load is not reached but that a predetermined fraction of the maximum load—for instance 1/10—is not reached. The relative resolution of the display of the maximum load for each state is then always the same.

FIG. 4 shows a further embodiment. As the embodiment of FIG. 1 is has a device 1, a logic 3 and a display 5 connected to logic 3 by means of line 4. Between device 1 and logic 3 a tare circuit 51 is mounted, which can determine the net weight from a total weight. Such circuits are known. Circuit 51 has a key 52 by means of which it is energized. The operation of circuit 51 is explained by means of an example. On the platform of device 1 there is a container in which a certain amount of a given good must be weighed. The weight of the container is determined in computing units m and transmitted over circuit 51 to logic 3. The latter corresponds to the logic represented in FIG. 3 and determines the states "normal", "fine" and "very fine". When key 52 is depressed the result of the weighing operation—regardless of the state determined by logic 3—is transmitted in computing unit m to a tare memory of circuit 51. It remains there until either key 52 is depressed again or device 1 detects weight zero and transmits it. This is the case when the container is taken off the scale. When the container is filled with a material, the new total weight determined in computing units m is transmitted to circuit 51, which substracts from it the tare weight recorded in its memory and transmits the difference—always in computing units m—to logic 3. The latter determines the state of the scale on the basis of this difference as described for FIG. 3.

When the platform is empty, weight zero is transmitted to circuit 51. Also this zero weight is recorded and, if key 52 is not depressed, it will also be deducted from the next weight transmitted. This means that the total weight of the goods on the platform is transmitted to logic 3. The scale according to FIG. 4 is particularly suited as dosing scale, as the weight of the container and that of the first components already weighed can be greater than the weight of the next dose by several orders of magnitude. The use of two scales—a coarse one for container and components, a fine one for small doses—can be avoided, which is great advantage in automatic installations.

In all embodiments a preferred ratio of 1:10 for the smallest display units of each range is mentioned. However, it is sufficient if this ratio is at least 1:2.

We claim:

1. In a scale, a computing device, a digital display, a platform for goods to be weighed, a first, a second and a third measuring range, said measuring ranges being nested and each being allocated a given smallest display unit, weights measured in each of said ranges being computed in said computing device and being displayed by said display device with the smallest displayed unit corresponding to that of each of said measuring ranges, the smallest display unit of each of said measuring ranges being at least in the ratio 2:1 compared with that of the next smaller range, first computing and logical means selecting the range in which the goods to be weighed must be measured by said computing device, said selection being made in function of the order of magnitude of the weight of the goods to be weighed, and second computing and logical means establishing in function of said order of magnitude the highest load that may be displayed by said display device.

2. In a scale, a computing device, a digital display, a platform for goods to be weighed, a first, a second and a third measuring range, said measuring ranges being nested and each being allocated a given smallest display unit, weights measured in each of said ranges being computed in said computing device and being displayed by said display device with the smallest displayed unit corresponding to that of each of said measuring ranges, the smallest display unit of each of said measuring ranges being in the ratio 10:1 compared with that of the next smaller range, first computing and logical means selecting the range in which the goods to be weighed must be measured by said computing device, said selection being made in function of the order of magnitude of the weight of the goods to be weighed, and second computing and logical means establishing in function of said order of magnitude the highest load that may be displayed by said display device.

3. In a scale, a computing device, a digital display, a platform for goods to be weighed, a first, a second and a third measuring range, said measuring ranges being nested and each being limited by a minimum and a maximum allowable load and each being allocated a given smallest display unit, weights measured in each of said ranges being computed to said computing device and displayed by said display device with the smallest displayed unit corresponding to that of each of said measuring ranges, the smallest display unit of each of said measuring ranges being in the ratio 10:1 compared with that of the next smaller range, first computing and logical means selecting the range in which the goods to be weighed must be measured by said computing device, said selection being made in function of the order of magnitude of the weight of the goods to be weighed, second computing and logical means establishing in function of said order of magnitude the highest load that may be displayed by said display device for each range, said highest load being equal to said maximum allowable load, said minimum allowable load for each range being equal to said maximum allowable load of the next smaller measuring range.

4. In a scale, a computing device, a digital display, a platform for goods to be weighed, tare computing means connected between said computing device and said digital display, a first, a second and a third measuring range, said measuring ranges being nested and each being limited by a minimum and a maximum allowable load and each being allocated a given smallest display unit, weights measured in each of said ranges being computed in said computing device and being displayed by said display device with smallest displayed unit corresponding to that of each of said measuring ranges, the smallest display unit of each of said measuring ranges being in the ratio 10:1 compared with that of the next smaller range, first computing and logical means selecting the range in which the goods to be weighed must be measured by said computing device, said selection being made in function of the order of magnitude of the weight of the goods to be weighed, second computing and logical means establishing in function of said order of magnitude the highest load that may be displayed by said display device for each range, said highest load being equal to said maximum allowable load, said minimum allowable load for each range being equal to said maximum allowable load of the next smaller measuring range.

* * * * *